United States Patent [19]

Farber

[11] 4,163,181

[45] Jul. 31, 1979

[54] VARIABLE-SPEED ELECTROMOTIVE DRIVE, ESPECIALLY FOR HOUSEHOLD APPLIANCES SUCH AS DOUGH KNEADERS

[75] Inventor: Karl-Heinz Färber, Giengen, Fed. Rep. of Germany

[73] Assignee: Bosch Siemens Hausgeräte GmbH, Stuttgart, Fed. Rep. of Germany

[21] Appl. No.: 857,703

[22] Filed: Dec. 5, 1977

[30] Foreign Application Priority Data

Dec. 8, 1976 [DE] Fed. Rep. of Germany ....... 2655574

[51] Int. Cl.² .............................................. H02P 5/40
[52] U.S. Cl. .................................... 318/245; 318/305; 318/345 G
[58] Field of Search ............... 318/245, 334, 301, 306, 318/333, 335, 345 R, 345 G, 305

[56] References Cited

U.S. PATENT DOCUMENTS

| 3,225,232 | 12/1965 | Turley et al. ............... 318/345 G X |
| 3,648,142 | 3/1972 | Corey et al. ...................... 318/345 G |
| 3,736,479 | 5/1973 | Soeda ..................................... 318/245 |
| 3,868,554 | 2/1975 | Konrad ................................. 318/334 |
| 3,962,615 | 6/1976 | Spangler ............................. 318/305 |

*Primary Examiner*—J. V. Truhe
*Assistant Examiner*—W. E. Duncanson, Jr.
*Attorney, Agent, or Firm*—Herbert L. Lerner

[57] ABSTRACT

Variable-speed electric motor drive includes a universal motor having a power supply line wherein a thyristor is connected and operated in a phase gating circuit, a firing circuit for the thyristor, a variable first resistance connected to the firing circuit of the thyristor for varying the rotary speed of the motor, and a temperature-dependent second resistance associated with the firing circuit and thermally coupled to the thyristor.

3 Claims, 1 Drawing Figure

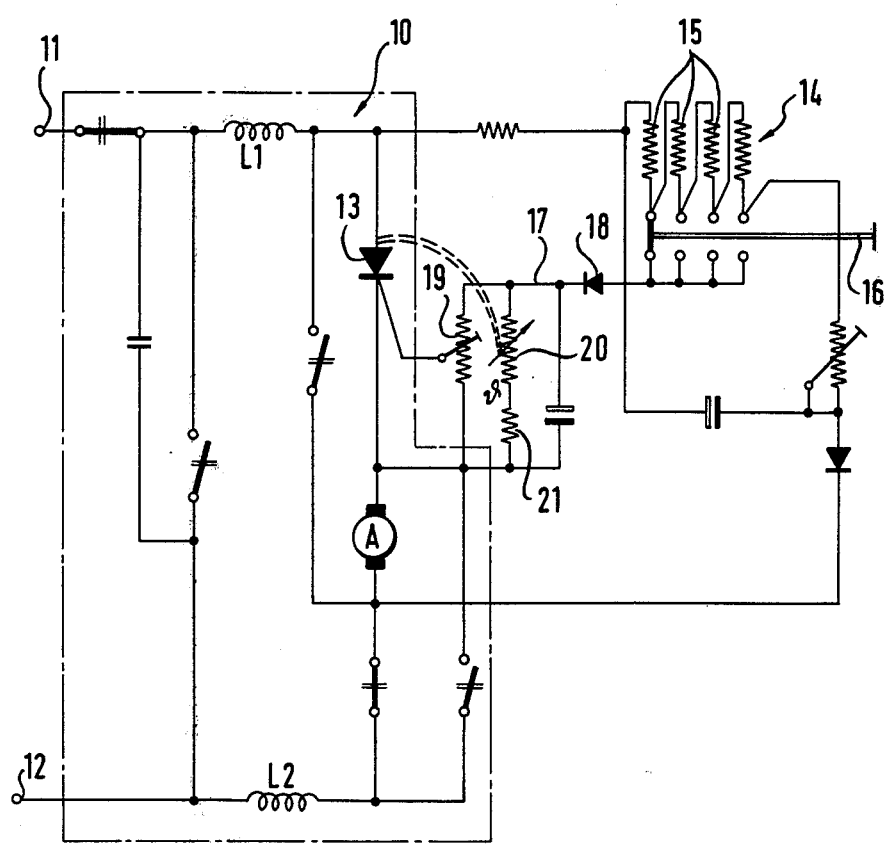

VARIABLE-SPEED ELECTROMOTIVE DRIVE, ESPECIALLY FOR HOUSEHOLD APPLIANCES SUCH AS DOUGH KNEADERS

The invention relates to a variable-speed electric motor drive, especially for houshold appliances such as dough kneaders or the like having a universal motor and a thyristor which is operated in a phase gating circuit and is connected into the power supply line of the motor. The firing circuit of the thyristor is controllable by a resistor which is variable in accordance with the desired speed of the motor.

Heretofore known variable-speed electric motor drives of the aforementioned type have the great inherent disadvantage that the firing voltage required for firing the thyristor behaves inversely to the operating temperature of the thyristor. As a result, the speed of a universal motor equipped with phase gating control increases considerably with increasing temperature of the thyristor. In cases in which accurate maintenance of the speed is important, a usually elaborate and expensive device such as a tachometer generator or the like is necessary to correct the change in speed.

In known electric motor drives having such phase gating controls for speed regulation, an attempt has been made heretofore to avoid the undesirable and often considerable speed deviations, which result due to changes of the operating temperature of the thyristor, by providing the thyristor with large heat exchange surfaces sometimes with the addition of forced ventilation. However, these heat exchange surfaces, which are supposed to keep the operating temperature of the thyristor constant by increased heat removal, can be used only where enough space is available. But even in such a case, the heat exchange surfaces have the disadvantage of being dependent on fluctuations of the ambient temperature and can therefore ensure reliable stabilization of the speed only to a limited extent.

The disadvantages which are caused by the lack of temperature stability of the characteristics of known thyristor types have a particularly adverse effect in drives in which speeds are to be maintained as constantly as possible during one working period, such as in dough kneaders, for example. Thus, it has been found, for example, to be a great shortcoming in such dough kneaders that the speed thereof increases considerably with increasing operating time and the increasing operating temperature resulting therefrom. In this regard, a frequency occurrence is that in stirring viscous and heavy material such as dough and the like, the speed remains approximately constant over an extended period of time due to the large torque required for kneading, in spite of the temperature rise of the thyristor. If the required torque is reduced, however, by adding liquid to the material to be stirred, then the rotary speed of the stirring tool sharply increases because of the operating temperature which has increased very steeply in the interim. This produces the danger that the stirring tool, then driven at a higher speed, may fling liquid and dough out of the stirring dish of the equipment. This detrimental effect can be observed especially in small household appliances, in which, due to the compact construction, the heat given off by the drive motor additionally warms up the thyristor and thereby further amplifies the undesirable effect of the unintended rise in speed.

It is therefore an object of the invention to provide a variable speed electric motor drive which overcomes the above-mentioned shortcomings of devices of this general type and to correct the unintended change in speed caused by the lack of temperature stability of the thyristor effecting the phase gating control in electric motor drives, and to construct such drives in such a way that they are capable of maintaining the speed which is optimum for a specific operation regardless of fluctuations of the operating temperature of the thyristor, even over extended operating periods of the drive.

With the foregoing and other objects in view, there is provided in accordance with the invention, in a variable-speed electric motor drive includes a universal motor having a power supply line wherein a thyristor is connected and operated in a phase gating circuit, a firing circuit for the thyristor, a variable first resistance connected to the firing circuit of the thyristor for varying the rotary speed of the motor, and a temperature-dependent second resistance associated with the firing circuit and thermally coupled to the thyristor.

By means of the circuit construction according to the invention, it is possible to reduce the firing current applied to the gate of the thyristor by the resistance of the temperature-dependent resistor or NTC, which decreases with increasing operating temperature to the extent that it becomes smaller with increasing temperature for firing the thyristor, and in this manner to avoid, premature firing of the thyristor at higher operating temperatures. With the drive according to the invention, the thyristor characteristics which are variable due to temperature variations, can therefore be compensated and the speeds of a universal motor, preslected by a phase gating control, can thereby be kept reliably constant in a simple manner.

In accordance with another feature of the invention, it is provided that the thyristor has a cooling element, the second resistor being secured to the cooling element. The cooling element may be in the form of a cooling vane or the like.

With a temperature-dependent resistance which is thus secured to the cooling element of the thyristor, any temperature change of the thyristor is directly transmitted to the resistance, so that thyristor characteristics deviating due to temperature variations are almost instantaneously compensated.

In accordance with a further feature of the invention, there is provided a voltage divider having an output, the output being connected to the firing circuit of the thyristor, the second resistance being shunted across the voltage divider.

In accordance with an additional feature of the invention, it is provided that the voltage divider is a variable resistor.

In accordance with a concomitant feature of the invention, there is provided a fixed third resistance connected in series with the second resistance.

In this manner, tolerance deviations of thyristors of the same type which are due to manufacturing processes, can be simply eliminated without changing the characteristic of the temperature-dependent resistance.

Other features which are considered as characteristic for the invention are set forth in the appended claims.

Although the invention is illustrated and described herein as embodied in a variable-speed electric motor drive, especially for household appliances such as dough kneaders, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the single FIGURE of the drawing which is a simplified schematic circuit diagram of the variable-speed electric motor drive of a dough kneader in accordance with the invention.

Referring now to the drawing, there is shown a universal motor 10, indicated symbolically in an area surrounded by dot-dash lines in the left-hand half of the FIGURE. In addition to various other circuit elements which are of no importance to the invention, the motor contains a field winding formed of the coils L1 and L2, and an armature A. The field windings L1 and L2 are equipped in a conventional manner with a therefore non-illustrated reversing and short-circuiting circuit. The short-circuiting circuit which serves for braking the armature A is connectible to the power line at the terminals 11 and 12. In the section of the power supply line of the universal motor 10 which is brought from the field winding L1 to the armature A a thyristor 13 is connected. The thyristor controls or influences the speed of the universal motor in a phase gating circuit in a conventional manner.

The control circuit of the thyristor 13, which can be seen on the right-hand side in the circuit diagram, outside the area surrounded by the dot-dash line, is equipped with a stepwise adjustable voltage divider 14. Additional circuit components which are not essential to the invention are also provided. The voltage divider 14 includes several fixed resistors 15 and a slider 16 by means of which the desired speed of the universal motor 10 can be set stepwise. From this voltage divider 14, a control line 17 is extended to the gate of the thyristor 13. In the control line 17, a diode 18 and, as a further voltage divider, a variable resistor in the form of a trimmer potentiometer 19 are connected. The tap of the trimmer potentiometer 19 is connected to the gate of the thyristor 13 and thus provides its firing voltage. In substance, the trimmer potentiometer 19 equalizes different firing voltages which occur in different thyristors of the same type due to tolerances caused by manufacturing processes.

A temperature-dependent resistor (NTC) 20 which, in turn, is connected in series with a fixed resistor 21 is shunted across the trim potentiometer 19 for compensating the firing of the thyristor 13, which takes place at a lower firing current with increasing operating temperatures. As symbolically indicated in the circuit diagram by two broken lines, the temperature-dependent resistor 20 is thermally coupled to the thyristor 13 in such a manner that a temperature rise of the thyristor due to operation is automatically transmitted to the temperature-dependent resistor 20. The conductivity of the latter increases with increasing temperature and thereby produces a voltage drop in the control line 17 whereby the voltage present at the control line of the thyristor 13 is lowered.

In the circuit described, by an appropriate choice of the type of temperature-dependent resistor 20, it is possible to hold the phase gating produced by the thyristor 13, independently of its operating temperature, exactly at the phase which corresponds to the speed set at the voltage divider 14.

The fixed resistor 21, which is connected in series with the temperature-dependent resistor 20 has a dual purpose. First, it prevents the conductivity of the temperature-dependent resistor 20 from becoming too high if the temperature rises very much, and, second, it prevents the firing voltage present at the gate from dropping so much, as a consequence, so that an undesirable shift in the firing instant and a change of the speed of the universal motor 10 caused thereby can occur.

The thermal coupling of the temperature-dependent resistor 20 to the thyristor 13 can be accomplished in any conventional manner as long as provision is made for good heat transfer between the two circuit elements. This can be accomplished in a conventional manner by mechanical connection such as bolting, riveting, clamping by means of a spring-elastic bracket, cementing or the like.

The thyristor may have a conventional cooling element, in which case the temperature-dependent resistor 20 may be coupled directly to the cooling element.

There are claimed:

1. In a variable-speed electric motor drive including a universal motor having a power supply line wherein a thyristor is connected and operated in a phase gating circuit, a firing circuit for the thyristor, a step-wise adjustable voltage divider having an output and with a plurality of fixed resistors and a slider by means of which the speed of the universal motor can be set stepwise to a desired speed, a control line extending from the voltage divider to the thyristor in which control line is a diode and another voltage divider in the form of a trimmer potentiometer for varying the rotary speed of the motor, and a temperature-dependent second resistance associated with the firing circuit and thermally coupled to the thyristor, said second resistance being shunted across said other voltage divider.

2. Drive according to claim 1 wherein the thyristor has a cooling element, said second resistor being secured to said cooling element.

3. Drive according to claim 1 including a fixed third resistance connected in series with said second resistance.

* * * * *